United States Patent [19]

Park et al.

[11] Patent Number: 5,700,223
[45] Date of Patent: Dec. 23, 1997

[54] POWER TRAIN OF FIVE-SPEED AUTOMATIC TRANSMISSION FOR VEHICLE

[75] Inventors: Seonghyon Park; Jinseong Kim; Donghoon Park, all of Kyungki-do, Rep. of Korea

[73] Assignee: Hyundai Motor Co., Seoul, Rep. of Korea

[21] Appl. No.: 592,382

[22] PCT Filed: May 25, 1995

[86] PCT No.: PCT/KR94/00057

§ 371 Date: Mar. 1, 1996

§ 102(e) Date: Mar. 1, 1996

[87] PCT Pub. No.: WO95/32101

PCT Pub. Date: Nov. 30, 1995

[30] Foreign Application Priority Data

Dec. 30, 1992 [KR] Rep. of Korea ............ 92-26759
Dec. 30, 1992 [KR] Rep. of Korea ............ 92-26760

[51] Int. Cl.$^6$ ........................................ F16H 3/44
[52] U.S. Cl. ................ 475/269; 475/204; 475/281; 475/285
[58] Field of Search ................. 475/200, 204, 475/206, 269, 275, 276, 280, 281, 284, 285

[56] References Cited

U.S. PATENT DOCUMENTS

| | | | |
|---|---|---|---|
| 4,090,415 | 5/1978 | Gorrell et al. | 475/280 X |
| 4,711,138 | 12/1987 | Miura et al. | 475/200 X |
| 4,722,242 | 2/1988 | Miura et al. | 475/204 X |
| 4,756,210 | 7/1988 | Franklin et al. | 475/204 X |
| 4,916,977 | 4/1990 | Aoki et al. | |
| 4,938,096 | 7/1990 | Takahashi et al. | 475/206 X |
| 4,942,785 | 7/1990 | Jürgens | |
| 5,099,718 | 3/1992 | Asada et al. | 475/276 X |
| 5,133,697 | 7/1992 | Hattori | 475/276 |
| 5,203,749 | 4/1993 | Ito | 475/200 X |
| 5,261,861 | 11/1993 | Lemieux | 475/200 X |
| 5,342,257 | 8/1994 | Hotta et al. | 475/275 |
| 5,389,047 | 2/1995 | Akiyama | 475/200 |
| 5,470,284 | 11/1995 | Taniguchi et al. | 475/204 |
| 5,474,503 | 12/1995 | Debler et al. | 475/206 X |
| 5,518,465 | 5/1996 | Hiraiwa | 475/275 |
| 5,542,889 | 8/1996 | Pierce et al. | 475/275 |

FOREIGN PATENT DOCUMENTS 0565111 10/1993 European Pat. Off. .

*Primary Examiner*—Charles A. Marmor
*Assistant Examiner*—Peter T. Kwon

[57] ABSTRACT

The present invention provides a power train for an automatic transmission of a vehicle, including: an input axle for delivering power from an engine; a main-transmission mechanism having a compound planetary gear unit for outputting the power as four speed ratios; a sub-transmission mechanism having a simple planetary gear unit for increasing a speed ratio which is output from the main-transmission mechanism as a largest speed ratio of the four speed ratios; the main-transmission mechanism including a first friction element for selectively transmitting the power from the input axle to a first sun gear of the compound planetary gear unit, a second friction element for making a second sun gear of the compound planetary gear unit as an idling element, a third friction element for selectively transmitting the power from the input axle to a planet carrier of the compound planetary gear unit, and a fourth friction element for operating the sun gear as a reacting force element; and the sub-transmission mechanism including a fifth friction element for operating a fifth sun gear of the simple planetary gear unit as the reacting force element.

20 Claims, 4 Drawing Sheets

FIG.2

|   |   | C1 | C2 | C3 | C4 | C5 | B1 | B2 | B3 | B4 | F1 | F2 | F3 | F4 | Engine Brake |
|---|---|----|----|----|----|----|----|----|----|----|----|----|----|----|--------------|
|   | P |    |    |    |    |    |    |    |    |    |    |    |    |    |              |
|   | R |    |    | O  | O  |    |    |    |    | O  |    |    |    | O  | YES          |
|   | N |    |    |    |    |    |    |    |    |    |    |    |    |    | NO           |
| V | 1 | O  |    |    |    |    |    |    |    |    | O  |    | O  | O  | NO           |
| V | 2 | O  |    |    |    |    | O  |    |    |    | O  | O  |    | O  | NO           |
| V | 3 | O  | O  |    |    |    | O  |    |    |    | O  |    |    | O  | NO           |
| V | 4 | O  | O  |    |    |    | O  | O  |    |    |    |    |    | O  | NO           |
| V | 5 | O  | O  |    |    |    | O  | O  | O  |    |    |    |    |    | YES          |
| IV | 1 | O  |    | O  |    |    |    |    |    |    | O  |    | O  | O  | NO           |
| IV | 2 | O  |    | O  |    |    | O  |    |    |    | O  | O  |    | O  | NO           |
| IV | 3 | O  | O  | O  |    |    | O  |    |    |    | O  |    |    | O  | NO           |
| IV | 4 | O  | O  | O  |    |    | O  | O  |    |    |    |    |    | O  | YES          |
| III | 1 | O  |    | O  | O  |    |    |    |    |    | O  |    | O  | O  | NO           |
| III | 2 | O  |    | O  | O  | O  |    |    |    |    | O  | O  |    | O  | NO           |
| III | 3 | O  | O  | O  | O  | O  |    |    |    |    | O  |    |    | O  | YES          |
| II | 1 | O  |    | O  | O  |    |    |    |    | O  | O  |    | O  | O  | YES          |
| II | 2 | O  |    | O  |    | O  | O  | O  |    |    | O  |    |    | O  | YES          |

FIG. 4

|   |   | C1 | C2 | C3 | C4 | C5 | B1 | B2 | B3 | B4 | F1 | F2 | F3 | F4 | Engine Brake |
|---|---|---|---|---|---|---|---|---|---|---|---|---|---|---|---|
| P |   |   |   |   |   |   |   |   |   |   |   |   |   |   |   |
| R |   |   |   | O | O |   |   |   |   | O |   |   |   | O | YES |
| N |   |   |   |   |   |   |   |   |   |   |   |   |   |   | NO |
| V | 1 | O |   |   |   |   |   |   |   |   | O |   | O | O | NO |
|   | 2 | O |   |   |   |   | O |   |   |   | O | O |   | O | NO |
|   | 3 | O | O |   |   |   | O |   |   |   | O |   |   | O | NO |
|   | 4 | O | O |   |   |   | O | O |   |   |   |   |   | O | NO |
|   | 5 | O | O |   |   |   | O | O | O |   |   |   |   |   | YES |
| IV | 1 | O |   | O |   |   |   |   |   |   | O |   | O | O | NO |
|   | 2 | O |   | O |   |   | O |   |   |   | O | O |   | O | NO |
|   | 3 | O | O | O |   |   | O |   |   |   | O |   |   | O | NO |
|   | 4 | O | O | O |   |   | O | O |   |   |   |   |   | O | YES |
| III | 1 | O |   | O |   | O |   |   |   |   | O |   | O | O | NO |
|   | 2 | O |   | O |   | O | O |   |   |   | O | O |   | O | NO |
|   | 3 | O | O | O |   | O | O |   |   |   | O |   |   | O | YES |
| II | 1 | O |   | O |   | O |   |   |   | O | O |   | O | O | YES |
|   | 2 | O |   | O |   | O | O | O |   |   | O |   | ⊘ | O | YES |

POWER TRAIN OF FIVE-SPEED AUTOMATIC TRANSMISSION FOR VEHICLE

BACKGROUND OF THE INVENTION

1. Field of the Invention

The present invention relates to a power train for a five-speed automatic transmission of a vehicle, and more particularly, to a power train which can output five forward speed ratios and one reverse ratio.

2. Description of the Related Art

In general, an automatic transmission comprises a planetary gear unit which is connected between a torque converter and a driven shaft.

The planetary gear unit includes a sun gear, a plurality of planet gears, a carrier mounting the planet gears to each other, and a ring gear.

Various clutches, brakes, and friction elements are utilized to selectively operate the gears of the planetary gear unit as reacting force elements or input elements to produce the desired speed ratios.

In a high-powered engine, failing to fully utilize a performance of the engine, the automatic transmission is deteriorated in its fuel consumption ratio, power capability, and driving capability.

Accordingly, in order to fully utilize the performance of the engine, multiple transmission speed ratios have been considered. The transmission having the multiple speed ratios requires that each speed ratio should be easily controlled. Easy control of the speed ratios means that when changing a speed from one speed ratio to another speed ratio, only one of the friction elements is controlled to realize the change of speed ratio.

U.S. Pat. No. 5,112,285 discloses a transmission having multiple transmission speed ratios. However, in this patent, when changing the speed from one speed ratio to another speed ratio, since a friction element which is in an engaged state should be released and another friction element should be engaged, controlling the speed ratio is complicated.

SUMMARY OF THE INVENTION

Accordingly, the present invention has been made in an effort to solve the above-described problem.

It is an object of the present invention to provide a power train of an automatic transmission for a vehicle which can fully utilize a performance of an engine.

It is another object of the present invention to provide a power train of the automatic transmission for the vehicle, which can easily accomplish a transmission control.

To accomplish the above objects, the present invention provides a power train for an automatic transmission of a vehicle, comprising: an input axle for delivering power from an engine; a main-transmission mechanism having a compound planetary gear unit for outputting the power as four speed ratios; a sub-transmission mechanism having a single planetary gear unit for increasing a speed ratio which is output from the main-transmission mechanism as a largest speed ratio of the four speed ratios; the main-transmission mechanism including a first friction element for selectively transmitting the power from the input axle to a first sun gear of the compound planetary gear unit, a second friction element for making a second sun gear of the compound planetary gear unit as an idling element, a third friction element for selectively transmitting the power from the input axle to a planet carrier of the compound planetary gear unit, and a fourth friction element for operating the sun gear as a reacting force element; and the sub-transmission mechanism including a fifth friction element for operating a fifth sun gear of the simple planetary gear unit as the reacting force element.

BRIEF DESCRIPTION OF THE DRAWINGS

Further objects and other advantages of the invention will become apparent from the following description in conjunction with the attached drawings, in which:

FIG. 2 is a table illustrating an operating sequence of friction elements at each speed ratio of the power train in FIG. 1;

FIG. 4 is a table illustrating an operating sequence of friction elements at each speed ratio of the power train in FIG. 3.

DETAILED DESCRIPTION OF THE PREFERRED EMBODIMENT

Figure 1:
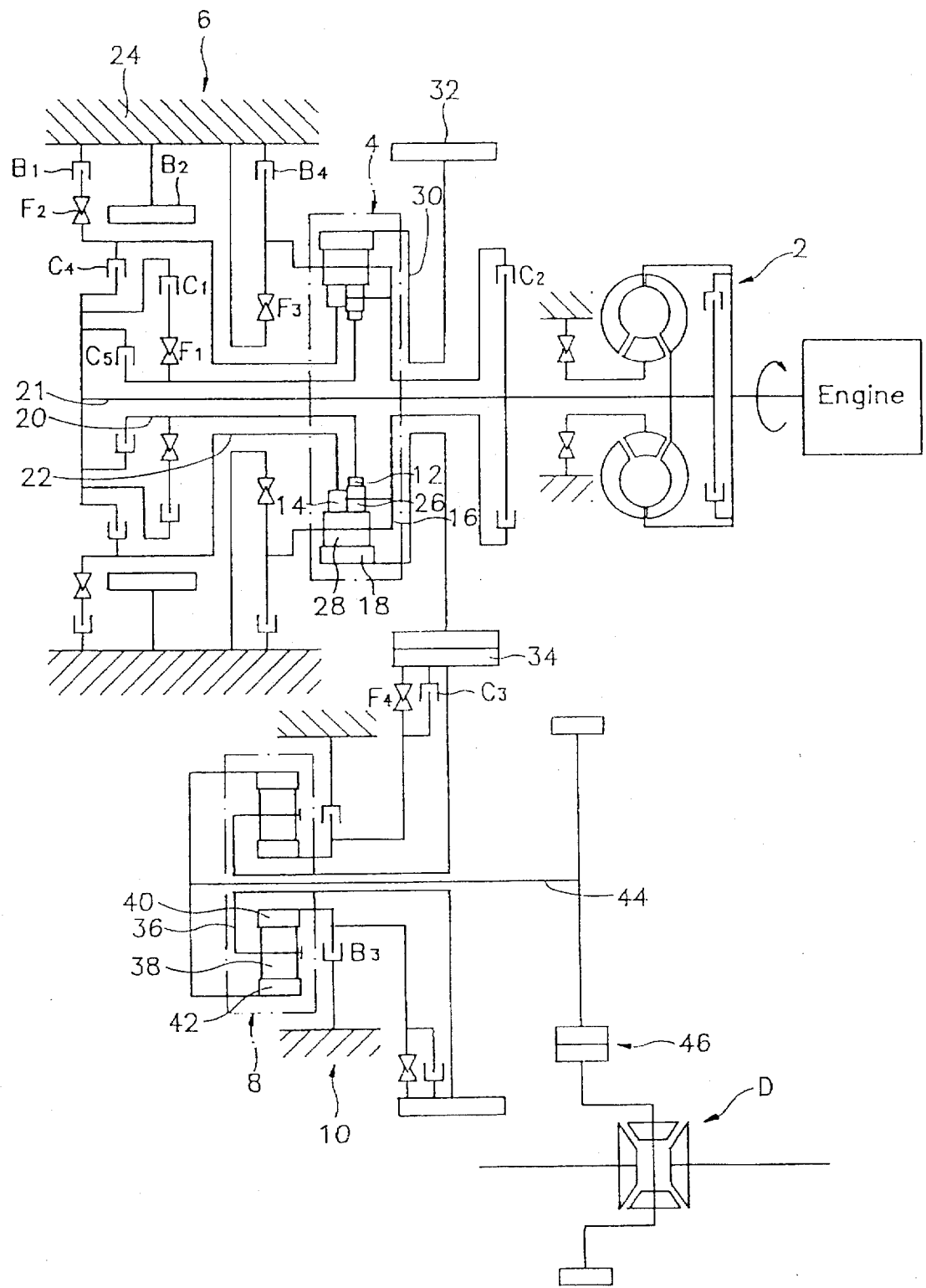
FIG. 1 is a schematic diagram showing a power train of an automatic transmission according to a first embodiment of the present invention.

Referring to FIG. 1, a power train connected between an engine (not shown) and a torque converter 2 includes a main-transmission mechanism 6 having a compound planetary gear unit 4 and a sub-transmission mechanism 10 having a simple planetary gear unit 8.

The power train has a structure which is suitable for a front drive vehicle, in which the compound planetary gear unit 4 includes first and second sun gears 12 and 14 and a planet carrier 16, all of which work as an input element, and a ring gear 18 which works as an output element.

The first sun gear 12 is designed to selectively receive a power from an input axle 21 through a first power transmitting member 20. This operation is enabled by use of a first friction element C1.

The first one-way clutch F1 is mounted between the first friction element C1 and the first power transmitting member 20, being designed to transmit the power in a clockwise direction when viewed from the engine side.

A second power transmitting member 22 formed with a hollow configuration is mounted on an outer circumference of the first power transmitting member 20. The first and second power transmitting member 20 and 22 are able to independently rotate with each other. The rotation of the second power transmitting member 22 is selectively suppressed by a second friction element B1 mounted on a transmission case 24.

A second one-way clutch F2 having the same structure as that of the first one-way clutch F1 is mounted between the second friction element B1 and the second power transmitting member 22 so that when the second friction element B1 is engaged, the second sun gear 14 becomes the reacting force element.

The planet carrier 16 of the compound planetary gear unit 4 is designed not to rotate in a counter-clockwise direction when viewed from the engine side by a third one-way clutch F3 mounted on the transmission case 24.

A third friction element C2 which is to be selectively engaged is mounted between the planet carrier 16 and the input axle 21, such that the first sun gear 12 and the planet carrier 16 simultaneously work as input elements of the compound planetary gear unit 4.

A fourth friction element B2 suppressing a rotation of the second power transmitting member 22 in any direction is mounted on the transmission case 24 so as to fix the second sun gear 14 as the reacting force element, such that a speed ratio of an over drive, that the number of rotation transmitted to the ring gear 18 is larger than that of the input, can be output.

This is realized by mounting first and second pinion gears 26 and 28 on the planet carrier 16 of the compound gear unit 4 and meshing the first and second pinion gears 26 and 28 with the first and second sun gears 12 and 14, respectively.

Further, the second pinion gear 28 is meshed with an inner circumference of the ring gear 18, rotating in the same direction as the ring gear.

The main-transmission mechanism 6 as described above can produce four forward speed ratios, and additionally the sub-transmission mechanism 10 can produce one forward speed ratio which has a smaller speed ratio than that of the over drive when the over drive speed ratio is realized in the compound planetary gear unit 4, whereby five forward speed ratios can be established.

That is, the ring gear 18 is integrally formed with an output drum member 30 and a transfer drive gear 32 is mounted on the output drum member 30, transmitting the power to a transfer driven gear 34 of the sub-transmission mechanism.

The transfer driven gear 34 is directly connected to a planet carrier 36 of the simple planetary gear unit 8 such that the planet carrier 36 can work as the input element. A third pinion gear 38 is mounted on the planet carrier 36 and is meshed with an outer circumference of a third sun gear 40. The third sun gear 40 is designed to work as a reacting force element by a fifth friction element B3 mounted on the transmission case 24.

Further, the ring gear 42 having an inner circumference meshed with the third pinion 38 is directly connected with an output shaft 44, transmitting the final reduction speed ratio to the differential gear D through a final reduction speed means 46.

The sub-transmission mechanism 10 further includes a fourth one-way clutch F4 mounted between the third sun gear 40 and the transfer driven gear 34. The fourth one-way clutch F4 is designed to suppress a free wheeling of the third sun gear 40 in a counter-clockwise direction when viewed from the engine side.

Further, while the power train changes the speed ratio within first through fourth forward speed ratios, the simple planetary gear of the sub-transmission mechanism should not change the speed ratio so that input and output becomes the same as each other. To realize this purpose, a sixth friction element C3 is mounted between the transfer driven gear 34 and the third sun gear 40.

On the other hand, the main-transmission mechanism 6 is designed to have a certain speed ratio for reversing the vehicle, in which a seventh friction element C4 is mounted between the input axle 21 and the second power transmitting member 22 and an eighth friction element B4 for fixing the planet carrier 16 as the reacting force element is mounted on the transmission case 24.

Further, a ninth friction element C5 is mounted between the input axle 21 and the first power transmitting member 20.

The friction elements having reference character "B" means a wet multiple-disc brake or a band brake and the friction elements having reference character "C" means a wet multiple-disc clutch, wherein the brakes are used for providing reacting force elements and the clutches are used for providing input elements.

The rotation direction, clockwise or counter-clockwise, which will be stated hereinafter is when viewed from the engine side.

The power train showing in FIG. 1 according to the first embodiment of the present invention produces the five forward speed ratios and one reverse speed ratio in accordance with an operation of a table of FIG. 2.

FIRST FORWARD RATIO

When a shift lever is selected to a drive range V, the transmission control unit TCU (not shown) is designed to engage only the friction element C1.

Accordingly, the power of the engine transmitted to the input axle through the torque converter 2 is transmitted to the first power transmitting member 20 and then transmitted to the first sun gear 12 of the compound planetary gear unit 4.

During this operation, since the first one-way clutch F1 mounted between the first friction element C1 and the first power transmitting member 20 has a structure which is transmitting the power in the clockwise direction, the power to be transmitted to the first sun gear 12 is transmitted through the first one-way clutch F1.

That is, the first sun gear 12 becomes the input element, in which since the rotation in the counter-clockwise direction of the planet carrier 16 is suppressed by the third one-way clutch F3, the planet carrier 16 acts as the reacting force element such that the rotation power in the clockwise direction rotates the first pinion gear 26 in the counter-clockwise direction while rotating the second pinion gear 28 in the clockwise direction.

Accordingly, the ring gear 18 meshed with the second pinion gear 28 in its inner circumference rotates in the clockwise direction, thereby transmitting the first forward speed ratio to the output drum member 30.

The first forward speed ratio is transmitted to the transfer driven gear 34 through the transfer drive gear 32, thereby rotating the driven gear 34 in the counter-clockwise direction.

The rotation in the counter-clockwise direction is transmitted to the third pinion gear 38 through the planet carrier 36 of the sub-transmission mechanism 10, thereby rotating the third ring gear 42 with the same number of rotations.

That is, the speed ratio of the main-transmission mechanism 10 is directly transmitted to the final reduction speed member 46 to obtain a final reduction speed without increasing or reducing the speed in the sub-transmission mechanism 10, such that the final speed reduction is transmitted to the differential gear D to drive the vehicle with the first forward speed ratio.

At this point, although the third sun gear 40 of the sub-transmission mechanism 10 tends to rotate in a faster speed, the third sun gear cannot rotate faster than the transfer driven gear 34 by the fourth one-way clutch F4.

In this speed reduction operation, the engine brake that the power is reversely transmitted from the wheel to the engine does not occur. At this point, the first, third, and fourth one-way clutches F1, F3, and F4 are to be in an engagement state and the second one-way clutch F2 is to be in a disengagement state.

SECOND FORWARD RATIO

When the vehicle speed is increased in the first forward speed ratio state, another friction element is designed to be engaged in addition to the first friction element C1 to output the second forward speed ratio by the transmission control unit TCU.

That is, the second friction element B1 is additionally engaged such that the first sun gear 12 becomes the input element of the compound planetary gear unit 4 of the main-transmission mechanism 6, while the second sun gear 14 becomes the reacting force element since the second one-way clutch F2 suppresses the rotation of the second sun gear 2 in a counter-clockwise direction by the engagement to the second friction element B1.

Accordingly, although the power transmitting path is the same as that of the first speed ratio, since the second pinion gear 28 is to revolve around the second sun gear 14, the ring gear rotate fast by the number of rotations of the revolution, thereby establishing the second forward speed ratio.

The second forward speed ratio is transmitted to the differential gear D through the sub-transmission mechanism 10 in the same manner as the first forward speed ratio, at this point, since the sub-transmission mechanism 10 does not work for the speed increasing or reducing operation, the vehicle is driven with the speed reduction ratio of the main-transmission mechanism 6. At this point, the third second and fourth one-way clutches F1, F2, and F4 are to be in an engagement state.

THIRD FORWARD RATIO

When the vehicle speed is increased in the second forward speed ratio state and an opening range of a throttle valve is increased, another friction element in addition to the first and second friction elements C1 and B1 is further engaged by the transmission control unit TCU.

That is, the third friction element C2 is additionally engaged such that the first sun gear 12 and the planet carrier 16 become simultaneously the input element of the compound planetary gear unit 4 of the main-transmission mechanism 6.

Accordingly, since both first and second sun gears 12 and 14 rotate in the clockwise direction and the first and second pinion gears 26 and 28 come into a locking state, the planetary gear unit 4 bodily rotates such that the number of rotations of the output becomes the same as that of the input.

This produces the third forward speed ratio larger than the second forward speed ratio, and the third forward speed ratio is transmitted to the sub-transmission mechanism to drive the vehicle through the differential gear D. At this point, the first and fourth one-way clutches F1 and F4 are to be in an engagement state, and the second and third one-way clutches are to be in a disengagement state.

FOURTH FORWARD RATIO

When the vehicle speed is increased in the third forward speed ratio state, another friction element in addition to the first, second, and third friction elements C1, B1, and C2 is further engaged by the transmission control unit.

That is, the fourth friction element B2 is additionally engaged, in which the second sun gear 14 which rotates in the same direction as that of the first sun gear in the third forward speed ratio state is fixed as the reacting force element, such that the second pinion gear 28 revolves around the second sun gear 14 in the same speed as that of the planet carrier 16.

Accordingly, the ring gear 18 transmits the number of rotation to which the number of the rotation and revolution of the second pinion gear 28 is added, that is, the fourth forward speed ratio, to the transfer drive gear 32.

The fourth forward speed ratio is directly transmitted to the differential gear D since no friction element of the sub-transmission mechanism is engaged. At this point, the fourth one-way clutch F4 is to be in an engagement state, and the first, second, and third one-way clutches F1, F2, and F3 are to be in a disengagement state.

FIFTH FORWARD RATIO

When the vehicle speed is increased in the fourth forward speed ratio state, the fifth friction element B3 of the sub-transmission mechanism 10 in addition to the first, second, third, and fourth friction elements C1, B1, C2, and B2 is additionally engaged by the transmission control unit TCU.

Accordingly, when the fourth forward speed ratio is transmitted from the main-transmission mechanism to the sub-transmission mechanism, since the fifth friction element B3 is engaged so that the third sun gear becomes the reacting force element and the third pinion gear 38 revolves around the third sun gear 40, the increased number of rotation is transmitted to the third ring gear 42.

That is, the fifth forward speed ratio is produced, in which the engine brake which the power is reversely transmitted from the wheel to the engine, is operated. At this point, all the one-way clutches F1, F2, F3, and F4 are to be in a disengagement state.

REVERSE RATIO

When the shift lever is selected to the "R" range, the seventh and eighth elements C4 and B4 of the main-transmission mechanism 6 and the sixth friction element C3 of the sub-transmission mechanism 10 are engaged by the transmission control unit TCU.

As a result, the rotation power of the input axle 21 is transmitted to the second sun gear 14 through the seventh friction element C4, rotating the second pinion gear 28 in the counter-clockwise direction. At this point, since the eighth friction element B4 is engaged, the planet carrier 16 becomes the reacting force element and the ring gear 18 rotates in the same direction as that of the second pinion gear 28, outputting the reverse speed ratio to the transfer drive gear 32.

The reverse speed ratio is transmitted to the planet carrier 36 of the sub-transmission mechanism through the transfer driven gear 34. At this point, since the sixth friction element is engaged, the simple planetary gear unit 8 is designed to have two input elements such that the number of rotation of the output becomes the same as that of the input.

In this reverse speed ratio, since the seventh friction element C4 is engaged, the engine brake is operated during coasting.

As described above, the present invention is designed to render the engine brake inoperable in the first through fourth forward speed ratios during coasting. However, if necessary, the present invention is designed to be able to operate the engine brake in each fourth, third, second, and first forward speed ratio.

That is, at the fourth forward speed ratio in drive range IV, the engine brake is operated during coasting, while the engine brake is not operated at the fourth forward speed ratio in the drive range V.

Namely, as shown in the table of FIG. 2, at the fourth forward speed ratio in drive range IV, since the sixth friction element C3 of the sub-transmission mechanism 10 is to be engaged, the free wheeling of the fourth one-way clutch F4 is suppressed during coasting mode in which the power is transmitted from the wheel to the engine, whereby the engine brake is operated.

When the shift lever is set on drive range III, as shown in the table of FIG. 2, the ninth friction element C5 of the main-transmission mechanism 6 is designed to be engaged such that the power is transmitted from the wheel to the engine, whereby engine brake is operated when the vehicle is coasting.

When the shift lever is set on drive range II, as shown in the table of FIG. 2, the engine brake is designed to be operated at the first and second forward speed ratios by engaging the eighth friction element B4 to fix the planet carrier 16 in the first forward speed ratio and by engaging the fourth friction element B2 to fix the second sun gear 14 in the second forward speed ratio.

As described above, the power train according to the first embodiment of the present invention has an advantage of easily controlling a speed ratio change by simply engaging the friction element one by one at each speed ratio during up-shift and disengaging the friction element one by one at each speed ratio during down-shift, and has another advantage that, if necessary, the engage brake can be operated in each range.

Figure 3:
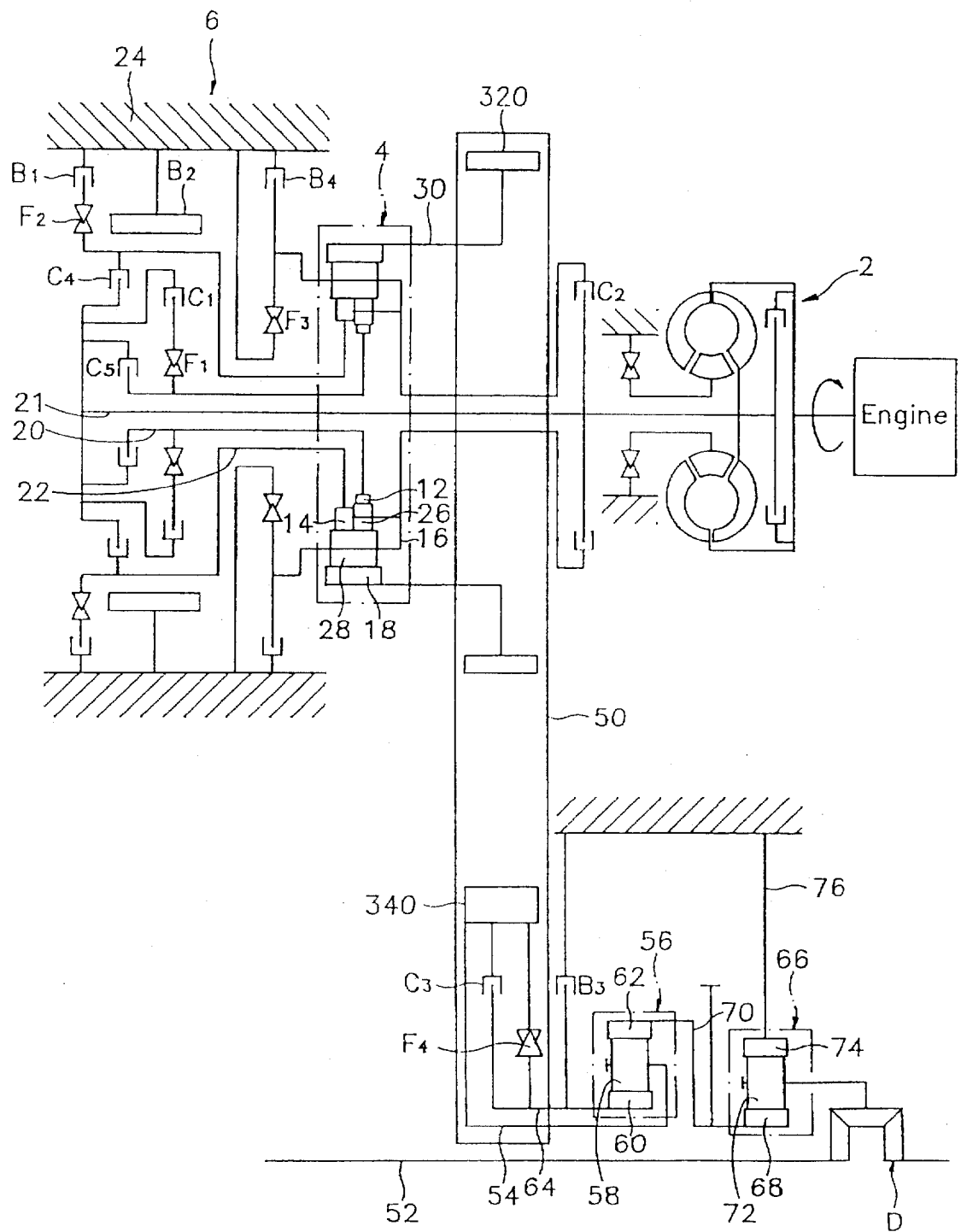
FIG. 3 is a schematic diagram showing a power train of an automatic transmission according to a second embodiment of the present invention.

FIG. 3 shows a power train of the automatic transmission in accordance with a second embodiment of the present invention, in which a main-transmission mechanism 6 has a same constitution as that of the first embodiment, while the sub-transmission mechanism 10 is constituted with two simple planetary gear units. Further, the power is transmitted by a chain interconnecting the main-transmission mechanism and the sub-transmission mechanism.

Accordingly, a transfer drive sprocket 320 integrally formed with the ring gear of the main-transmission mechanism 6 through the output drum member 30 is connected with a transfer driven sprocket 340 of the sub-transmission mechanism 10 by the chain 50.

Since the sub-transmission mechanism is symmetrical on the basis of an output shaft 52, only the half section is illustrated in FIG. 3.

The transfer driven sprocket 340 integrally mounted on a planet carrier 54 is connected to a pinion gear 58 of a first simple planetary gear unit 56, and a pinion gear 58 is meshed with an outer circumference of the sun gear 60 and meshed with an inner circumference of the ring gear 62.

The sun gear 6 is designed to transmit the power to a power transmitting member 64 through the sixth friction element C3 mounted between the sun gear 60 and the transfer driven sprocket 340, and a fourth one-way clutch F4 is mounted between the power transmitting member 64 and the transfer driven gear 340 such that the power is transmitted in the counter-clockwise direction.

The power train as described above changes the speed ratio by selectively engaging the friction elements, as shown in the table of FIG. 4.

The operation of the speed ratio change according to the second embodiment is the same as that of the first embodiment as shown in FIGS. 1 and 2, except that the sun gear 68 of the second simple planetary gear unit 66 acts as the input element, the ring gear 74 acts as the reacting force element and the pinion gear 72 as the output element for the operation of the final reduction speed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power train for an automatic transmission of a vehicle, comprising:
    an input axle for delivering power from an engine;
    a main-transmission mechanism selectively operatively connected to the input axle and having a compound planetary gear unit for outputting the power as four speed ratios;
    a sub-transmission mechanism operatively connected to the main-transmission mechanism and having a simple planetary gear unit for increasing a speed ratio which is output from the main-transmission mechanism;
    the main-transmission mechanism including a first friction element for selectively transmitting the power from the input axle to a first sun gear of the compound planetary gear unit, a second friction element for selectively making a second sun gear of the compound planetary gear unit an idling element, a third friction element for selectively transmitting the power from the input axle to a planetary carrier of the compound planetary gear unit, and a fourth friction element for selectively operating the first sun gear as a reacting force element.

2. The power train of claim 1, wherein a first one-way clutch is mounted between the first sun gear of the compound planetary gear unit and the first friction element to only allow transmission of the power in a clockwise direction when viewed from the engine.

3. The power train of claim 1, wherein the second sun gear of the compound planetary gear unit is connected to the second friction element by a second one-way clutch which is capable of free wheeling in the clockwise direction.

4. The power train of claim 1, wherein the main-transmission mechanism and the sub-transmission mechanism further include a transfer drive gear and a transfer driven gear, respectively, the transfer drive and driven gears being meshed with each other to transmit the power.

5. The power train of claim 1, wherein the main-transmission mechanism and the sub-transmission mechanism further include a transfer drive sprocket and a transfer driven sprocket, respectively, the transfer drive and driven sprockets being meshed with each other to transmit the power.

6. The power train of claim 1, wherein the sub-transmission mechanism comprises:
    a power transfer means for receiving the power from the main-transmission mechanism;
    a first simple planetary gear unit including a pinion gear directly connected to the power transfer means, a sun gear meshed with an outer circumference of the pinion gear, and a ring gear whose inner circumference is meshed with the pinion gear; and
    a second simple planetary gear unit including a sun gear directly connected to the ring gear of the first simple planetary gear unit, a pinion gear of the second simple planetary gear unit meshed with an outer circumference of the sun gear of the second simple planetary gear unit to transmit the power to a differential gear, and a ring gear of the second simple planetary gear unit whose inner circumference is meshed with the pinion gear of the second simple planetary gear unit.

7. The power train of claim 6, further comprising:
    a fifth friction element for selectively operatively connecting the sun gear of the first simple planetary gear unit to the power transfer means to serve as an input element; and a sixth friction element for selectively fixing rotation of the sun gear of the first simple planetary gear unit so that the sun gear of the first simple planetary gear unit serves as a reaction element.

8. The power train of claim 1, wherein:
the simple planetary gear unit includes a third sun gear, third pinion gears in a gearing relationship with the third sun gear, a third planetary carrier operationally connected to said third pinion gears, and a third ring gear in a gearing relationship with the third pinion gears; and further comprising,
a fifth friction element for selectively operating said third sun gear of the simple planetary gear unit as a reacting force element.

9. The power train of claim 8, wherein the sub-transmission mechanism further comprises:
a transfer driven gear operationally connected to the main-transmission mechanism; and
a fourth one-way clutch mounted between the third sun gear and the transfer driven gear to prevent the third sun gear of the simple planetary gear unit from rotating faster than the third pinion gears.

10. The power train of claim 9, wherein the fourth one-way clutch is suppressed in its rotation in a counter-clockwise direction when viewed from the engine.

11. The power train of claim 1, wherein the compound planetary gear unit includes the first and second sun gears, first pinion gears in a gearing relationship with the first sun gear, second pinion gears in a gearing relationship with the first pinion gears and the second sun gear, the planetary carrier for both the first and second pinion gears, and a single ring gear in a gearing relationship with the second pinion gears.

12. A power train for an automatic transmission, comprising:
a compound planetary gear unit including a first ring gear, a first and second sun gear, first pinion gears in a gearing relationship with said first sun gear, second pinion gears in a gearing relationship with said first pinion gears and said second sun gear, a first planetary carrier for said first and second pinion gears, and a first ring gear in a gearing relationship with said first pinion gears;
a second transmission unit operationally connected to said compound planetary gear unit;
an input shaft supplying power from an engine;
a first one-way clutch connected between said first planetary carrier and a housing of said automatic transmission;
a first friction element selectively operationally connecting said first sun gear and said input shaft to establish a first forward speed ratio in cooperation with said first one-way clutch;
a second one-way clutch connected to said second sun gear;
a second friction element selectively operationally connecting said second one-way clutch to said housing of said automatic transmission to establish a second forward speed ratio; and
a third friction element selectively connecting said first planetary carrier to said input shaft to establish a third forward speed ratio.

13. The power train of claim 12, further comprising:
a fourth friction element selectively operationally connecting said second sun gear to said housing of said automatic transmission to establish a fourth forward speed ratio.

14. The power train of claim 13, wherein
said second transmission unit including at least one simple planetary gear unit which has a third sun gear, third pinion gears in a gearing relationship with said third sun gear, a second planetary carrier for said third pinion gears, and a second ring gear in a gearing relationship with said second pinion gears; and further comprising,
a fifth friction element selectively connecting said third sun gear to said housing of said automatic transmission to establish a fifth forward speed ratio.

15. The power train of claim 13, wherein
said second transmission unit including at least one simple planetary gear unit which has a third sun gear, third pinion gears in a gearing relationship with said third sun gear, a second planetary carrier for said third pinion gears, and a second ring gear in a gearing relationship with said second pinion gears; and further comprising,
power transfer means for transferring power from said compound planetary gear unit to said second transmission unit; and
a third one-way clutch connected between said power transfer means and said third sun gear.

16. The power train of claim 13, further comprising:
a third one-way clutch connected between said first sun gear and said first friction element.

17. A power train for an automatic transmission, comprising:
a compound planetary gear unit including a first ring gear, a first and second sun gear, first pinion gears in a gearing relationship with said first sun gear, second pinion gears in a gearing relationship with said first pinion gears and said second sun gear, a first planetary carrier for said first and second pinion gears, and a first ring gear in a gearing relationship with said first pinion gears;
a second transmission unit operationally connected to said compound planetary gear unit;
an input shaft supplying power from an engine;
a first one-way clutch connected to said first sun gear;
a second one-way clutch connected to said second sun gear; and
a third one-way clutch connected between said first planetary carrier and said housing of said automatic transmission;
a first friction element selectively operationally connecting said first one-way clutch and said input shaft to establish a first forward speed ratio wherein said first and third one-way clutches are engaged; and
a second friction element selectively operationally connecting said second one-way clutch to said housing of said automatic transmission to establish a second forward speed ratio wherein said third one-way clutch is disengaged and said first and second one-way clutch are engaged.

18. The power train of claim 17, further comprising:
a third friction element selectively connecting said first planetary carrier to said input shaft to establish a third forward speed ratio wherein said second and third one-way clutches are disengaged and said first one-way clutch is engaged.

19. The power train of claim 18, wherein
said second transmission unit including at least one simple planetary gear unit which has a third sun gear, third pinion gears in a gearing relationship with said third sun gear, a second planetary carrier for said third pinion gears, and a second ring gear in a gearing relationship with said second pinion gears; and further comprising, power transfer means for transferring power from said compound planetary gear unit to said second transmission unit;

a fourth one-way clutch connected between said power transfer means and said third sun gear; and a fourth friction element selectively operationally connecting said second sun gear to said housing of said automatic transmission to establish a fourth forward speed ratio wherein said first, second and third one-way clutch are disengaged and said fourth one-way clutch is engaged.

20. The power trains of claim 19, further comprising:

a fifth friction element selectively connecting said third sun gear to said housing of said automatic transmission to establish a fifth forward speed ratio wherein said first, second, third and fourth one-way clutches are disengaged.

* * * * *